(12) United States Patent
Zhu

(10) Patent No.: US 10,211,774 B2
(45) Date of Patent: Feb. 19, 2019

(54) MOUNTING APPARATUS FOR SOLAR PANELS

(71) Applicant: Guohao Zhu, Haining (CN)

(72) Inventor: Guohao Zhu, Haining (CN)

( * ) Notice: Subject to any disclaimer, the term of this patent is extended or adjusted under 35 U.S.C. 154(b) by 0 days.

(21) Appl. No.: 15/631,031

(22) Filed: Jun. 23, 2017

(65) Prior Publication Data
US 2018/0342975 A1 Nov. 29, 2018

(30) Foreign Application Priority Data

May 24, 2017 (CN) .......................... 2017 1 0371642

(51) Int. Cl.
*H02S 20/23* (2014.01)
*H02S 30/10* (2014.01)
*F16M 13/02* (2006.01)
*F16B 5/02* (2006.01)

(52) U.S. Cl.
CPC ............ *H02S 20/23* (2014.12); *F16B 5/0225* (2013.01); *F16B 5/0233* (2013.01); *F16B 5/0258* (2013.01); *F16M 13/022* (2013.01); *H02S 30/10* (2014.12)

(58) Field of Classification Search
CPC ........ H02S 20/23; H02S 30/10; F16B 5/0258; F16B 5/0233; F16B 5/0225; F16M 13/022

See application file for complete search history.

(56) References Cited

U.S. PATENT DOCUMENTS

| 8,713,881 B2 * | 5/2014 | DuPont ................. F24S 25/634 |
| | | 52/489.2 |
| 9,331,629 B2 * | 5/2016 | Cheung ................... H02S 20/23 |
| 9,705,447 B2 * | 7/2017 | Cavieres ................. H02S 30/10 |
| 2005/0019096 A1 * | 1/2005 | Prange ................... F16B 7/0486 |
| | | 403/231 |
| 2005/0226683 A1 * | 10/2005 | Herb ....................... E04B 9/127 |
| | | 403/230 |

* cited by examiner

Primary Examiner — Jeanette E Chapman
(74) Attorney, Agent, or Firm — Fox Rothschild LLP

(57) ABSTRACT

The present invention provides a mounting assembly for attaching solar panels to a rooftop. The assembly allows for convenient installment and adjustment of the panels.

14 Claims, 26 Drawing Sheets

MOUNTING APPARATUS FOR SOLAR PANELS

FIELD OF THE INVENTION

The present invention relates to a novel mounting assembly for installing solar panels.

BACKGROUND OF THE INVENTION

Solar power has long been viewed as an important alternative energy source. To this end, substantial efforts and investments have been made to develop and improve upon solar energy collection technology. Of particular interest are residential-, industrial- and commercial-type applications in which relatively significant amounts of solar energy can be collected and utilized in supplementing or satisfying power needs. One way of implementing solar energy collection technology is by assembling an array of multiple solar modules.

One type of solar energy system is a solar photovoltaic system. Solar photovoltaic systems ("photovoltaic systems") can employ solar panels made of silicon or other materials (e.g., III-V cells such as GaAs) to convert sunlight into electricity. Photovoltaic systems typically include a plurality of photovoltaic (PV) modules (or "solar tiles") interconnected with wiring to one or more appropriate electrical components (e.g., switches, inverters, junction boxes, etc.).

Most PV applications entail placing an array of solar modules at the installation site in a location where sunlight is readily present. This is especially true for residential, commercial or industrial applications in which multiple solar modules are desirable for generating substantial amounts of energy, with the rooftop of the structure providing a convenient surface at which the solar modules can be placed. it can be important to ensure that the array of solar modules or panels is reliably and stably anchored to the roof, whether the roof is an angled or flat roof. Moreover, it can be important to ensure that a user can easily, effectively, and rapidly mount one or more solar module(s) or panels to the roof.

SUMMARY OF THE INVENTION

The present invention relates to mounting assemblies for solar panels. The mounting assemblies allow easy installation and replacement of the solar panels. The invention provides horizontal as well as vertical adjustment and is especially suitable for installing solar panels on rooftop with uneven surfaces.

An aspect of the invention provides a mounting assembly for attaching one or more solar panels to a roof top. The assembly includes a mounting base installable on a rooftop, a mounting station and a first and a second mounting brackets.

The mounting bracket generally includes a mounting plate and a first and second supporting walls perpendicularly connected to opposite edges of the mounting plate and configured to attach to the mounting station. The mounting plate or at least one of the first and second supporting walls includes an extended top portion which protrudes upward from a mounting surface of the mounting plate. The top portion has a guide channel extending from a side edge of the top portion to receive an L-shaped portion of a frame of a solar panel.

Another aspect of the invention provides a mounting assembly for connecting two adjacent columns of solar panels. The assembly includes a mounting base, a linking unit connectable to the mounting base, and two sets of mounting brackets.

DETAILED DESCRIPTION OF THE INVENTION

Figure 1A:
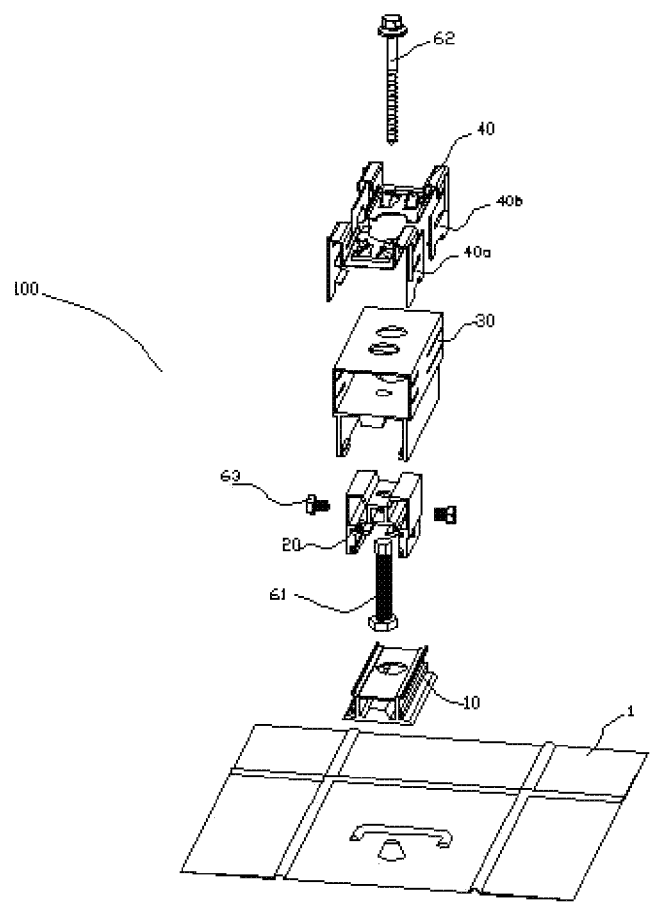
FIG. 1a shows a mounting assembly 100 which includes a mounting base including seat 10 and slider 20, mounting station 30, and two mounting brackets 40 (40a and 40b).

Various embodiments of the invention disclose an apparatus for mounting a photovoltaic system. The apparatus is structurally and functionally advantageous over conventional devices in terms of simplified and improved components and enhanced stability. The apparatus also allows for fast and convenient adjustment during the mounting process of solar panels. The low cost of manufacturing further adds to the benefit of the apparatus.

While the inventions disclosed herein are often described in the context of photovoltaic panels, arrays and modules, these inventions can be used in other contexts as well, such as concentrated PV systems, thermal solar systems, etc.

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

The articles "a" and "an" as used herein mean "one or more" or "at least one," unless otherwise indicated. That is, reference to any component of the present invention by the indefinite article "a" or "an" does not exclude the possibility that more than one of the component is present.

In addition, certain terminology may also be used in the following description for the purpose of reference only, and thus are not intended to be limiting. For example, terms such as "upper", "lower", "above", and "below" refer to directions in the drawings to which reference is made. Terms such as "front", "back", "rear", and "side" describe the orientation and/or location of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second", and other such numerical terms referring to structures do not imply a sequence or order unless clearly indicated by the context.

An aspect of the invention provides a mounting assembly for attaching one or more solar panels to a rooftop. The assembly generally includes a mounting base installable on a rooftop; a mounting station connectable to the mounting base, wherein the mounting station includes a top plate connected to two side plates; and a first mounting bracket and a second mounting bracket. Each of the first and second mounting bracket includes a mounting plate, and a first and second supporting walls. The first and second supporting walls are perpendicularly connected to opposite edges of the mounting plate and configured to attach to the mounting station. Each of the supporting walls can be a single layer structure or a multiple layer structure. For example, a supporting wall can include an inner layer and an outer layer, which are inter-connected.

An extended top portion protrudes upward from the mounting plate or one or both of the first and second supporting walls. The top portion includes a guide channel extending horizontally from a side edge of the top portion and above the top surface of the mounting plate to receive an L-shaped portion of a frame of a solar panel. In some embodiments, each of two supporting walls includes an extended top portion. In some embodiments, the mounting plate includes an extended top portion. In some embodiments, each of the mounting plate and one or both of the support walls includes an extended top portion.

Figure 1B:
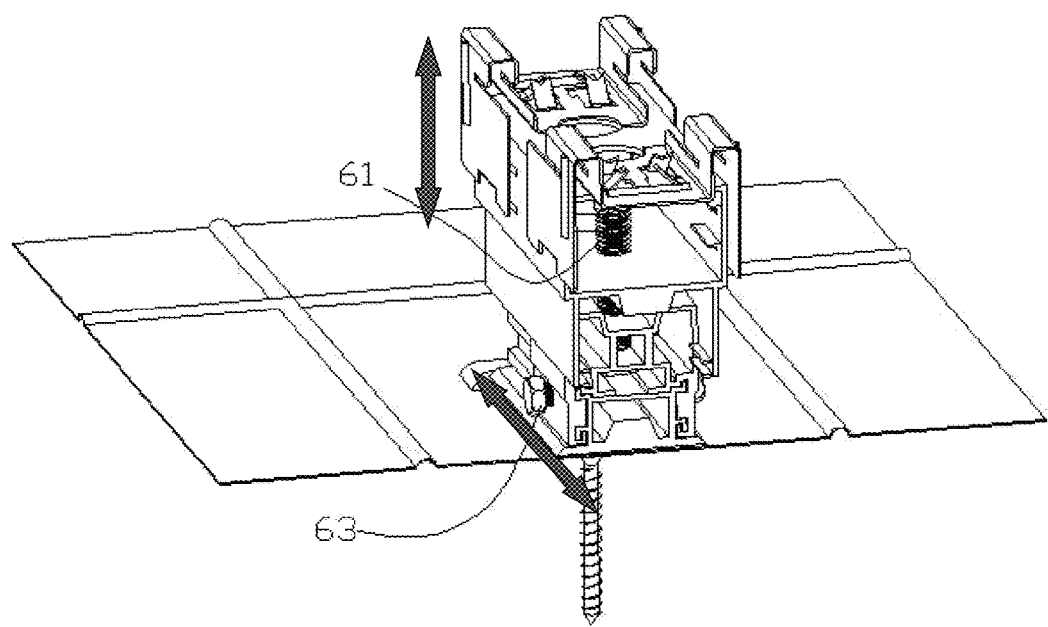
FIG. 1b shows that the assembly 100 can move vertically as well as horizontally.

Referring to FIG. 1, an embodiment of a mounting assembly 100 includes a mounting base including seat 10 and slider 20, mounting station 30, and two mounting brackets 40 (40a and 40b). The mounting brackets are attached to mounting box 30, which is further connected to slider 20 via a first screw 61. Because first screw 61 passes through a threaded portion of mounting station 30 and has a lower end positioned in the mounting base, turning the screw allows the adjustment of the height of the mounting station relative to the mounting base. Slider 20 slides along the sliding channels of seat 10 in a longitudinal direction of the seat and is locked with screw 63 once in position. A second screw 62 secures seat 10 to the rooftop, which has a pre-installed water guard 1.

Figure 2:
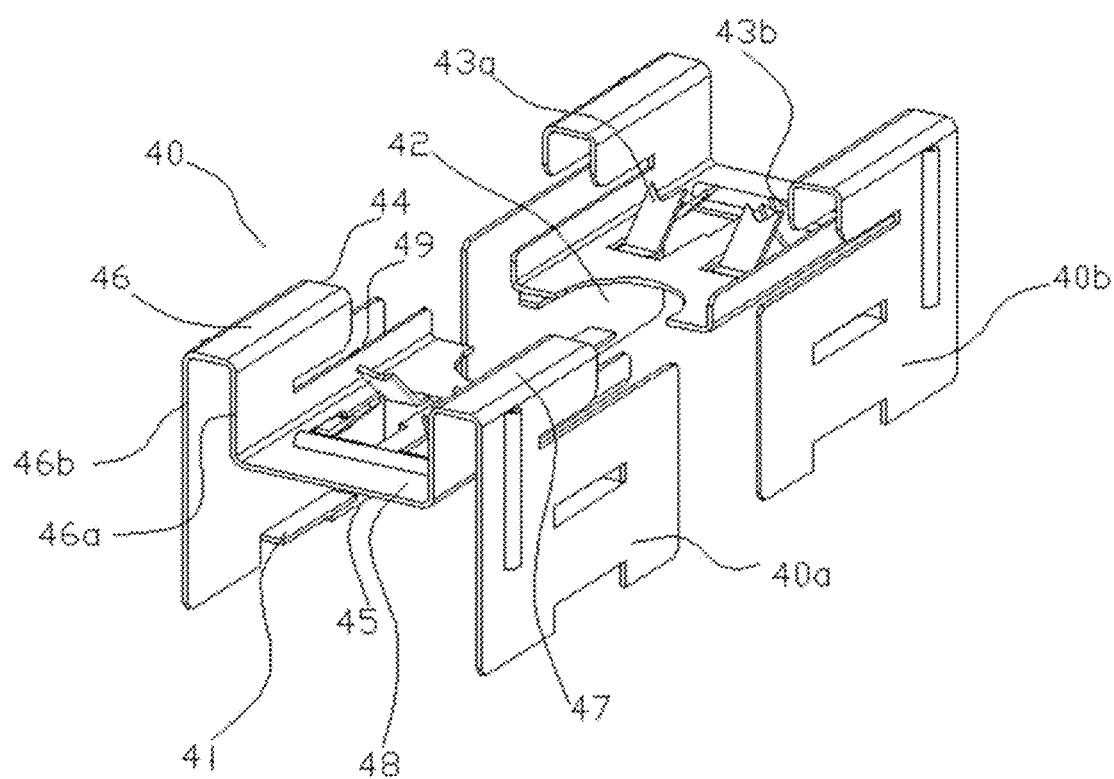
FIG. 2 shows the two brackets 40a and 40b are each defined by supporting walls 46 and 47, which are perpendicularly connected to opposite edges of mounting plate 45.

An important component of the assembly is mounting bracket 40. As illustrated in FIG. 2, the two brackets 40a and 40b are each defined by supporting walls 46 and 47, which are perpendicularly connected to opposite edges of mounting plate 45. The supporting walls each contain an inner layer connected to an outer layer (e.g. 46a and 46b for supporting wall 46). A portion of the supporting walls protrudes above the mounting surface 48 of mounting plate 45 to form top portion 44. For example, the inner layer 46a and a part of the outer layer 46b together forms top portion 44. A guide channel 49 extends from a side edge of top portion 44 for receiving an L-shaped portion of a frame of a solar panel. When a pair of mounting brackets are aligned, it is necessary to have an opening 42 for access to screws 61 and 62. Separate openings for the two screws are also feasible. In some embodiments, each of the first and second mounting brackets can have a cut-out on the mounting plate, and the combined cut-outs, when the mounting brackets move close to each other, form a single hole for access to the screws. In some embodiments, only one of the mounting plates have an opening for access to one or two of the screws. In some embodiments, each of the mounting plate have an opening for access to screw 61 or screw 62, respectively.

Mounting plate 45 includes a first resilient plate 43a extending from the mounting plate upwards at an angle with respect to the surface of the mounting plate and is oriented parallel to a longitudinal direction of the mounting plate. The resilient plate 43a has a serrated top edge configured to touch a bottom surface of the frame of the solar panel when the L-shaped portion of the frame of the solar panel is fully engaged with the guide channel so that the solar panel is prevented from longitudinal movement along the guide channel. The mounting plate also includes a second resilient plate 43b extending from the mounting plate upwards at an angle with respect to the surface of the mounting plate and is oriented perpendicular to a longitudinal direction of the mounting plate. The resilient plate 43b also has a serrated top edge configured to touch a bottom surface of the frame of the solar panel when the L-shaped portion of the frame of the solar panel is fully engaged with the guide channel so that the solar panel is prevented from lateral movement perpendicular to the guide channel. Certainly, the numbers of each type of the resilient plates and shape of their top edges can vary depending on factors such as manufacturing cost and installation location.

Figure 3:
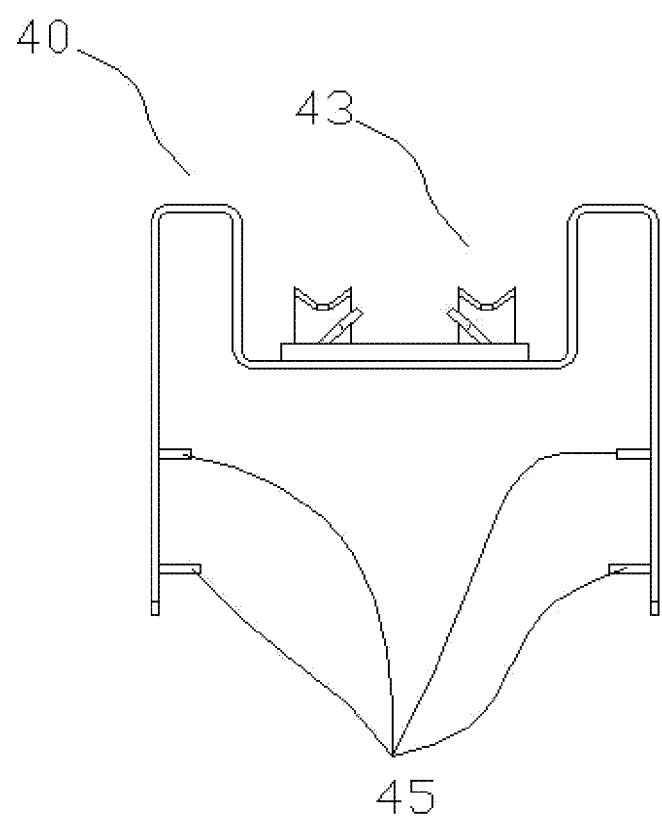
FIG. 3 shows mounting bracket 40 with supporting arm 41 which engages with the slots in the mounting station.

Referring to FIG. 3, mounting bracket 40 also includes supporting arm 41 which engages with the slots in the mounting station. The exact shape and number of the supporting arm can also be modified as long as they serve the purpose of attaching the mounting bracket to the mounting station. For example, one or more supporting arms can have a further bent-down section to ensure attachment of the bracket with the mounting station.

Figure 4:
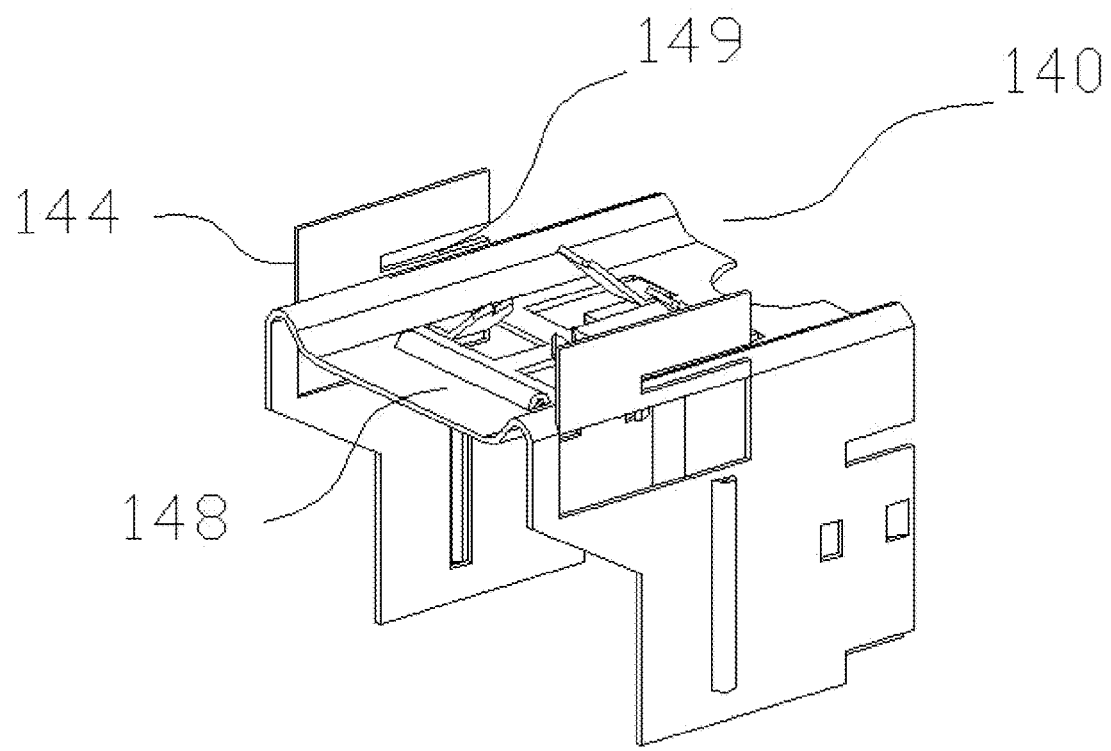
FIG. 4 shows the extended top portion 144 which is formed from a flip-up section in the outer layer of the supporting wall and protrudes upward and above the top surface of the mounting plate 140.

Various bracket designs can be made based on the above described bracket 40. For example as shown in the bracket 140 of FIG. 4, the extended top portion 144 is formed from a flip-up section in the outer layer of the supporting wall and protrudes upward and above the top surface of the mounting plate. The extended top portion 144 also has a guide channel 149. The bracket also has supporting arms or locking pins for attaching to a mounting station or a base. Similar to mounting bracket 40, the guide channel 149 is also above the mounting surface 148.

Figure 5:
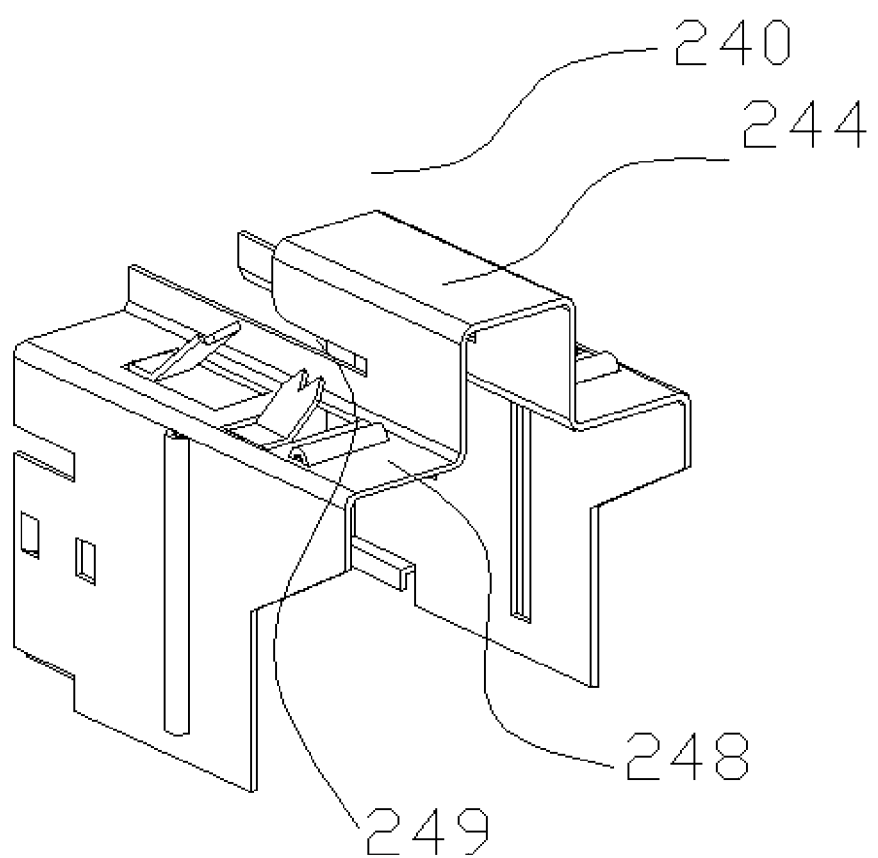
FIG. 5 shows mounting bracket 240 having a top portion 244 which protrudes upward and is above the mounting surface 248 of the mounting plate.
Figure 6:
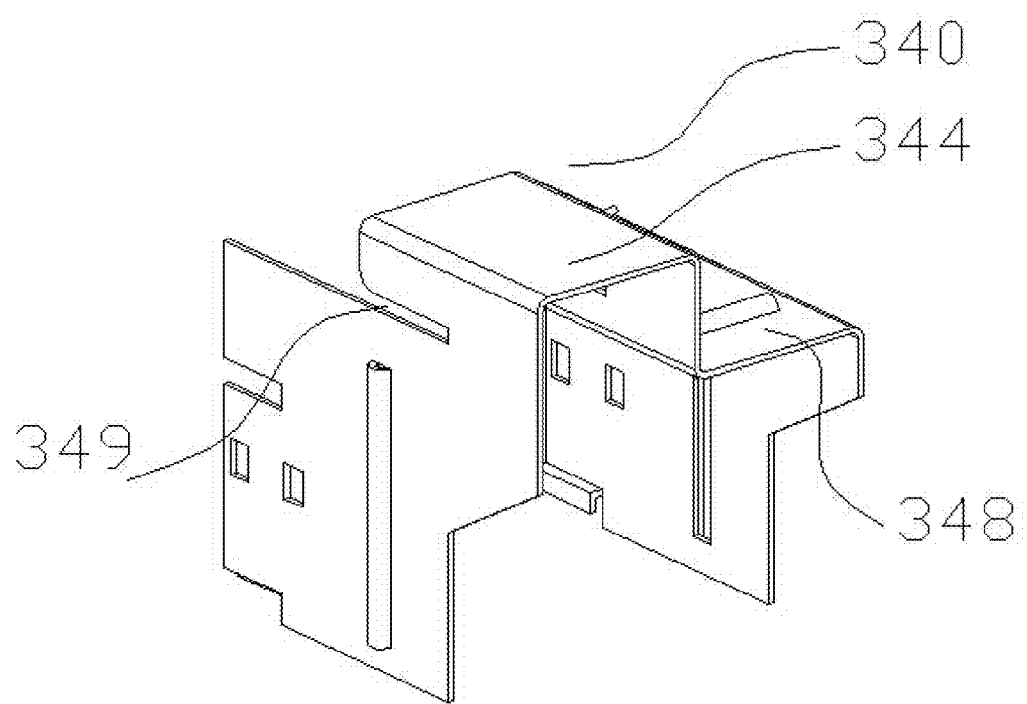
FIG. 6 shows mounting bracket 240 having a portion of the mounting plate adjacent to the supporting wall which protrudes upward above the mounting surface 348 to form a top portion 344 having a guide channel 349.

In another exemplary embodiment as shown in the bracket 240 of FIG. 5, a top portion 244 protrudes upward and is above the mounting surface 248 of the mounting plate. The top portion 244 includes two inter-connected side walls and receive the L-arm of the solar panel into the guide channel 249. In yet another exemplary embodiment as shown in FIG. 6, a portion of the mounting plate adjacent to the supporting wall protrudes upward above the mounting surface 348 to form a top portion 344 having a guide channel 349. A side wall of the top portion 344 thus overlaps with a portion of the supporting wall.

Whether the extended top portion is positioned in the supporting walls or in the mounting plate, it protrudes above the mounting surface of the mounting plate so that a guide channel can be formed therein to receive the L-arm of the solar panel. As long as the protrusion or the extended top portion serves that purpose, its specific structure can vary. For example, the protrusion or the extended top portion can be a single layer or a double layer of a supporting wall. It can also be a single layer or a multi-layer structure protruding from the mounting plate. When the protrusion or the extended top portion contain double or multiple layers, it is not necessary to have a connecting component between the top edges of the protruding double or multiple layers. Each of the mounting bracket including all aforementioned components can be made from a single piece of metal.

Figure 7:
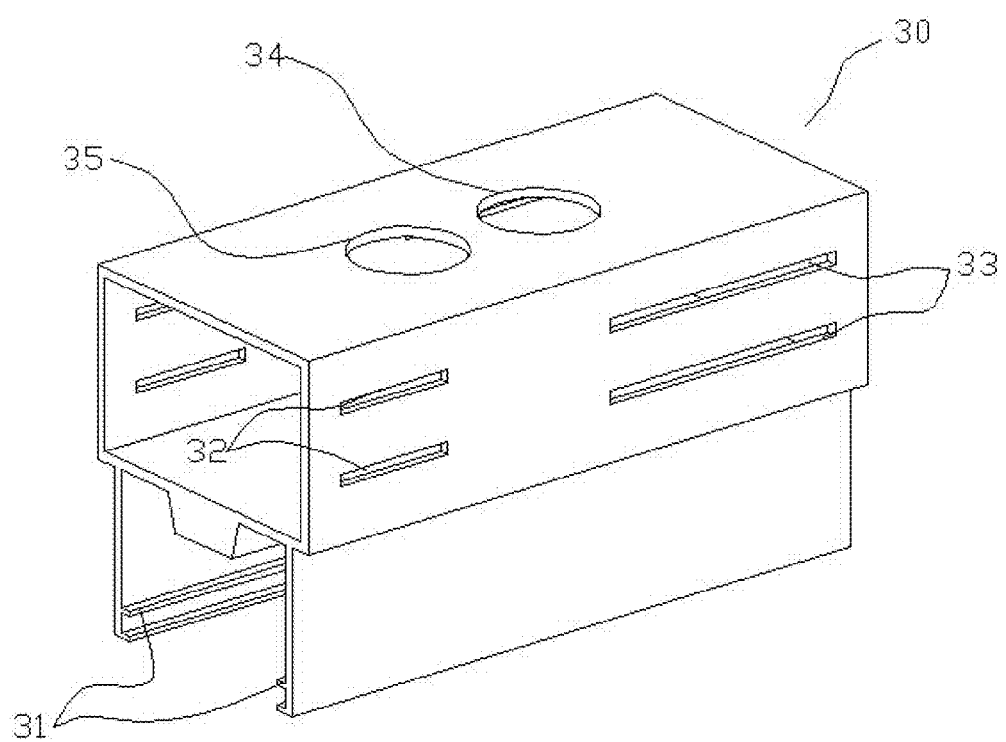
FIG. 7 shows mounting station 30 which is configured to receive the supporting arms of the mounting brackets.

Referring to FIG. 7, mounting station 30 is configured to receive the supporting arms of the mounting brackets. Specifically, supporting arm 41 of the first mounting bracket is secured into slot 32. Meanwhile, supporting arm 41 of the second mounting bracket inserts into slot 33 and is slidable along the slot as needed to adjust the position of the mounting station. The mounting station can be configured in various ways to lock the first mounting bracket in place. For example, instead of using slots, the mounting station can have locking holes matching locking teeth or pins from the first mounting bracket. Alternatively, the locking teeth or pins or supporting arms can be structured on the mounting station matching complementary components of the first mounting bracket. Although the top plate of the mounting station is depicted in FIG. 7 as being positioned at the top end of the side plates, it can in theory be positioned anywhere between the two side plates as long as it serves to secure the side plates in the stable configuration. One or more plates between the two side plates can also be included in the mounting station.

Opening 34 provides an access for inserting or removing screw 62, which fixes the seat 10 of the mounting base to the rooftop. Opening 35 provides access to screw 61, which passes through a threaded portion 38. By turning screw 61, the mounting station 30 can be moved up and or down relative to the mounting base. Openings 34 and 35 can be combined into a single one.

Figure 8:
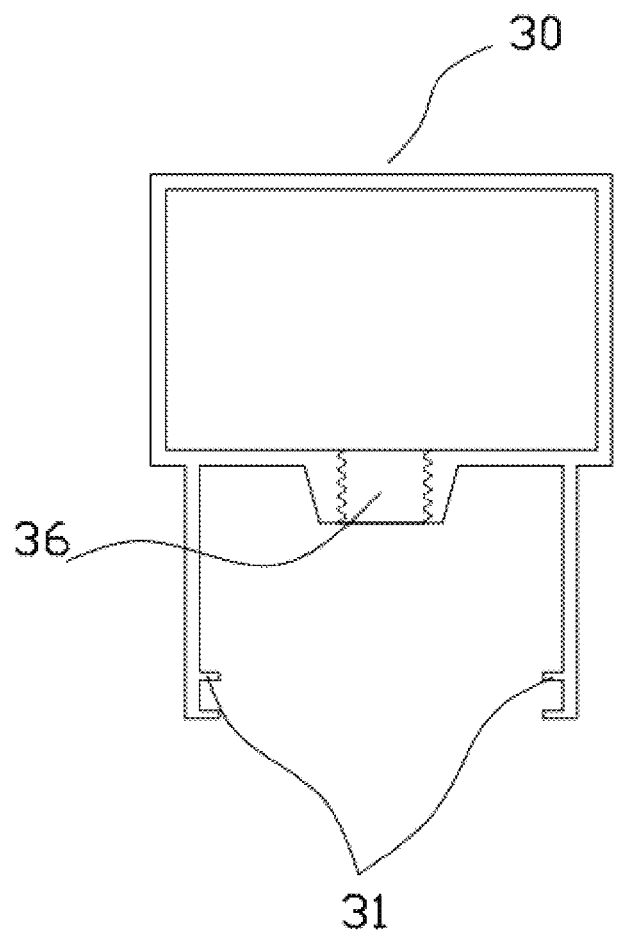
FIG. 8 shows a frontal view of the mounting station 30.
Figure 9:
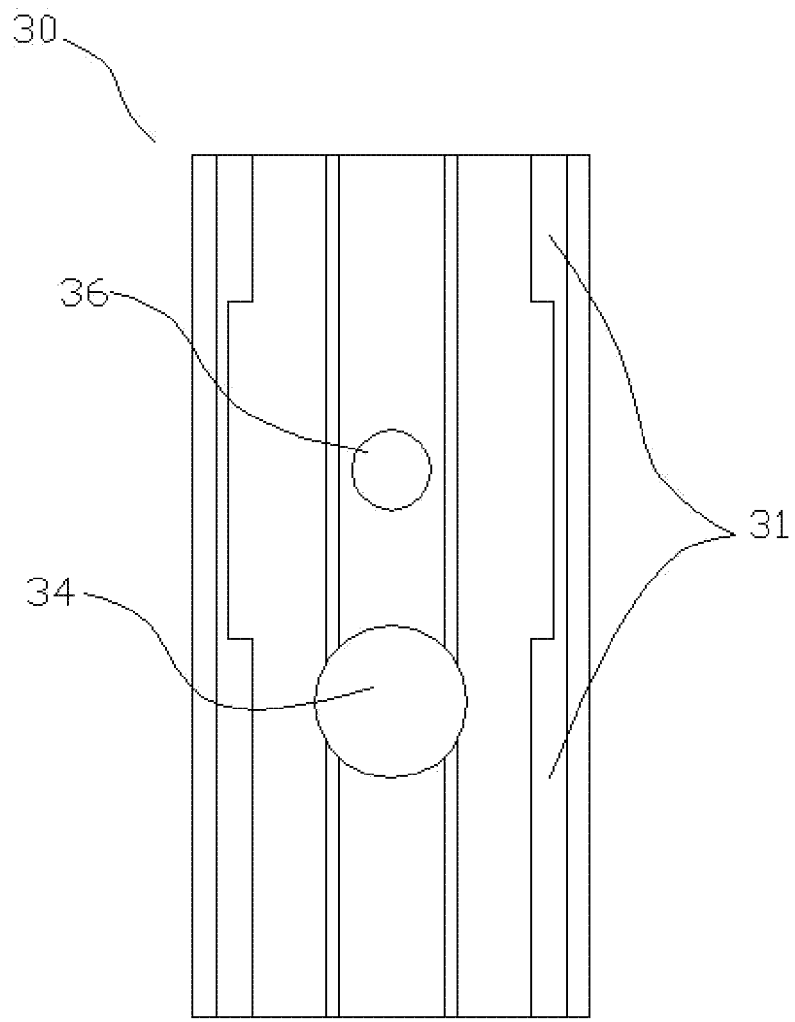
FIG. 9 shows a bottom of the station, where hole 36 is the bottom end of the threaded portion.

FIG. 8 provides a frontal view of the mounting station 30. Arm 31 stabilizes the station on the mounting base. Hole 36 has a threaded inside surface. FIG. 9 shows a bottom of the station, where hole 36 is the bottom end of the threaded portion.

Figure 10:
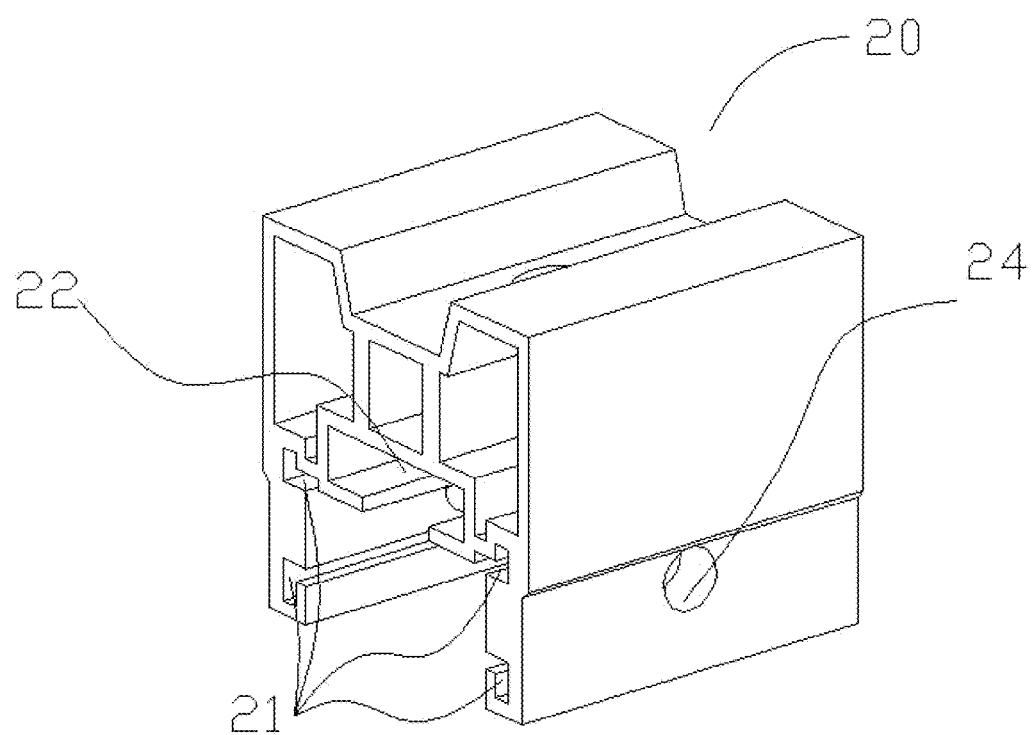
FIG. 10 shows slider 20 which is a structural component of the mounting base and sits on seat 10.
Figure 11:
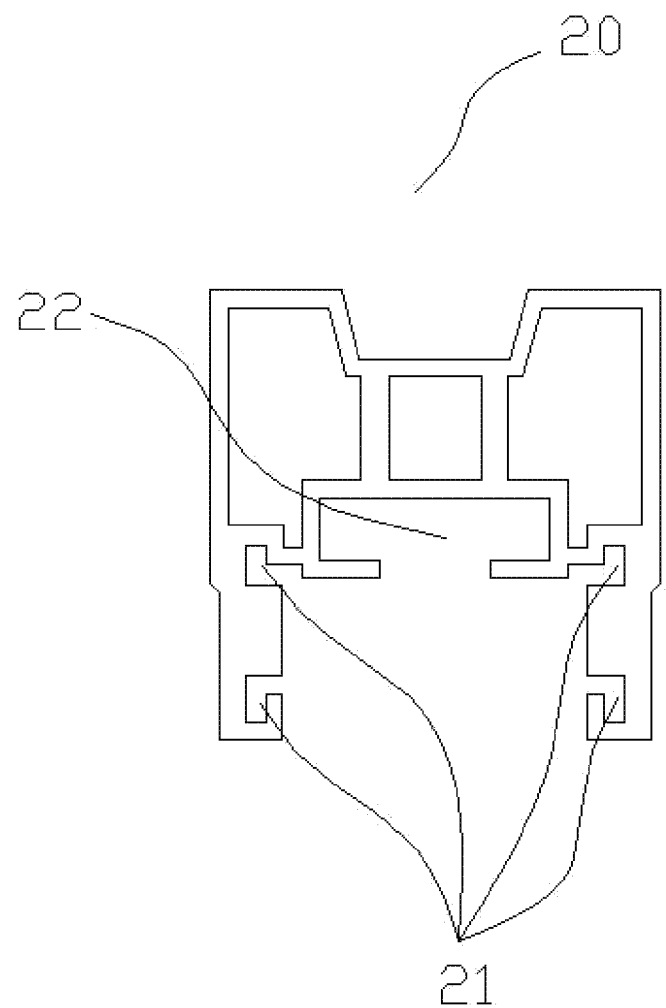
FIG. 11 shows a frontal view of the slider.
Figure 12:
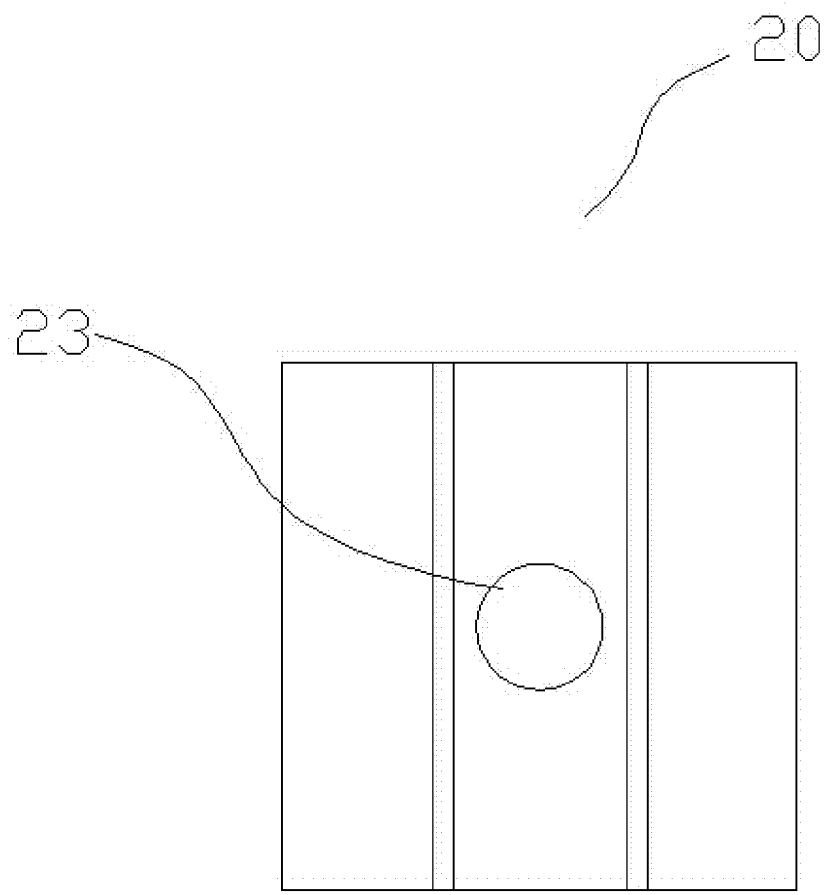
FIG. 12 shows the bottom of the slider where the bottom end of screw 61 comes out of hole 23.

Referring to FIG. 10, slider 20 is a structural component of the mounting base and sits on seat 10. If a sliding feature is not needed, slider 20 can certainly integrate with seat 10 into a single unit. Guide tunnel 21 receives rail 13 from seat 10. Chamber 22 accommodates the bottom end of screw 61. Hole 24 with threaded inside surface receives screw 63 to lock the slider in a desired position. FIG. 11 provides a frontal view of the slider. FIG. 12 shows the bottom of the slider where the bottom end of screw 61 comes out of hole 23. A nut with a diameter larger than that of hole 23 at the lower end of screw 61 prevents the screw from slip out. The nut 65 shown in FIG. 1 is permanently fixed to the end of the screw and turns together with the screw 61 in chamber 22.

The screw 61 serves to adjust the height of the mounting station. In another exemplary embodiment, the threaded portion can also be placed in the slider of the mounting base, while the top end of the screw carries the mounting station through a nut fixed at a certain height position of the screw body. Turning the screw thus moves the mounting station up or down.

Figure 13:
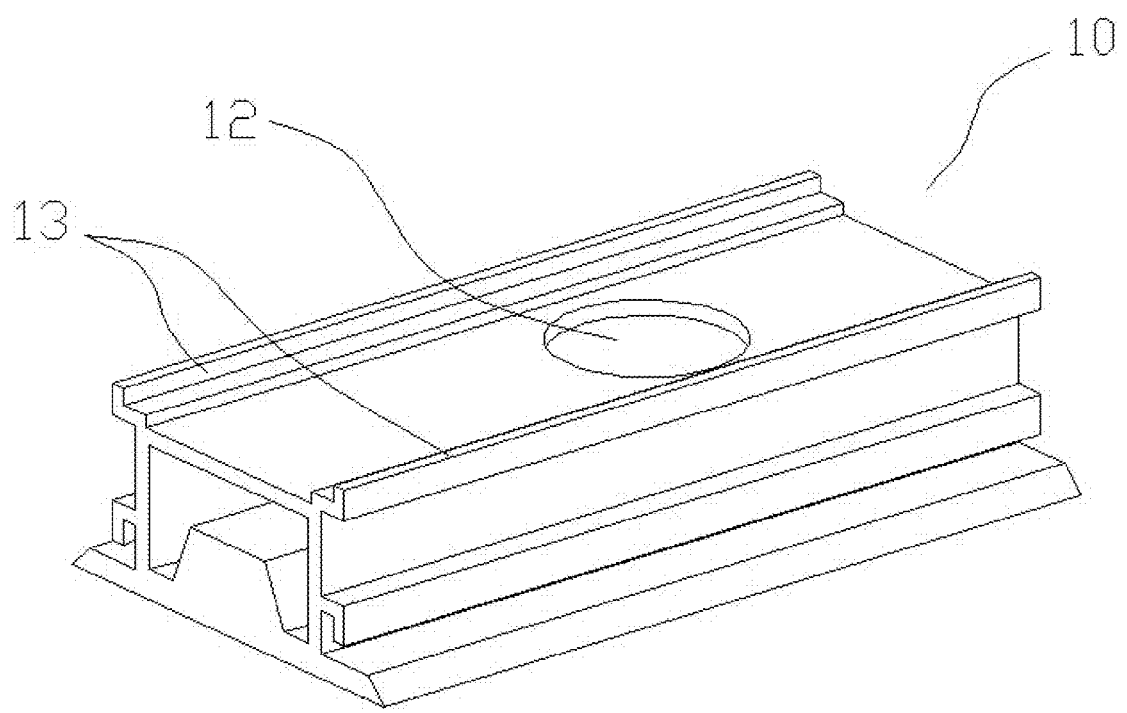
FIG. 13 shows seat 10 which is connectable to slider 20.
Figure 14:
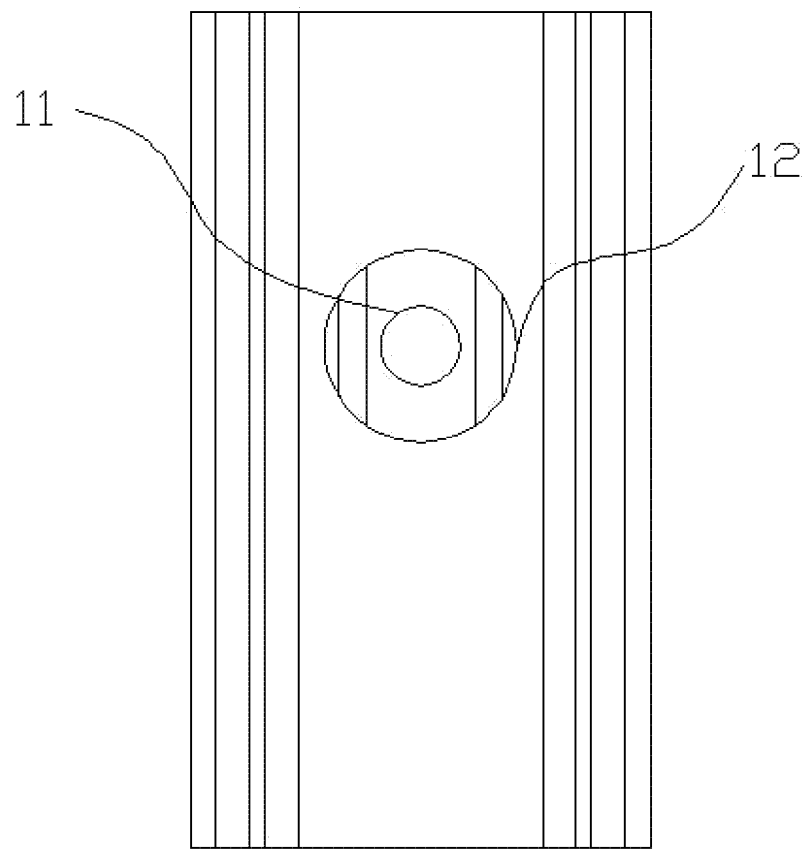
FIG. 14 shows hole 12 which provides access to the anchor point 11.

Referring to FIG. 13, seat 10 connects to slider 20. Rail 13 matches guide channel 21 and thus allows the slider to move in a horizontal direction. In an exemplary alternative, seat 10 can be configured to include one or more guide channels to match the rails of the slider. Hole 12 in FIG. 14 provides access to the anchor point 11, where a screw secures the seat to the rooftop.

Figure 15:
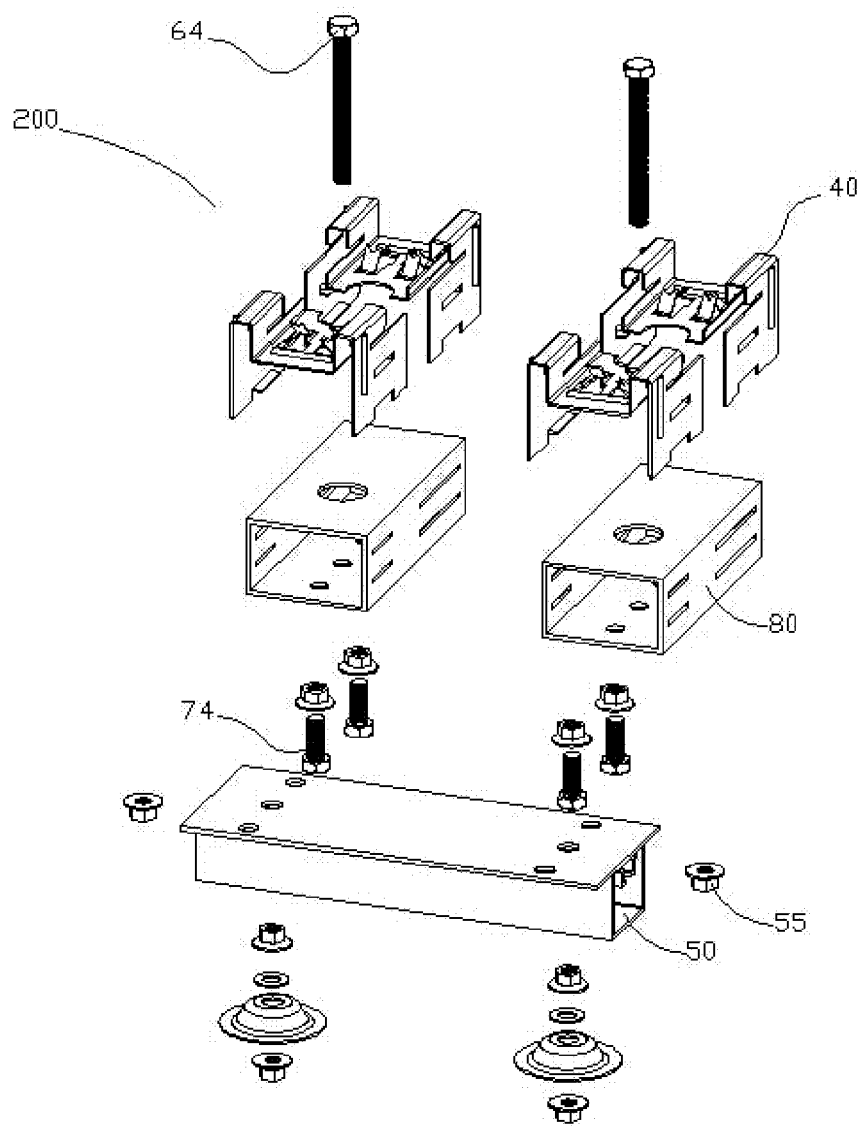
FIG. 15 shows mounting assembly 200 which includes two sets of mounting brackets, each of which links two adjacent solar panels in the same column and the linking platform 50 links two solar panels in two adjacent columns.

Referring to FIG. 15, a related mounting assembly 200 includes two sets of mounting brackets, each of which links two adjacent solar panels in the same column and the linking platform 50 links two solar panels in two adjacent columns. Each individual mounting bracket 40 in the two sets of brackets is the same as described above and attaches to mounting box 80. Each set of brackets includes a first mounting bracket 40a and a second mounting bracket 40b.

Similar to what is described above for mounting station 30, mounting box 80 also contains a short slot 81 and a long slot 82. The short slot 81 engages the supporting arm of the first mounting bracket and locks it in place. The long slot 82 restricts the movement of the second mounting bracket within the slot. The mounting box 80 is secured to the linking platform 50 with one or more screws. Although assembly 200 is described separately from assembly 100, they can certainly be combined into a single assembly. Although the top plate of the mounting station is depicted in FIG. 15 as being positioned at the top end of the side plates, it can in theory be positioned anywhere between the two side plates as long as it serves to secure the side plates in the stable configuration. One or more plates between the two side plates can be included in the mounting station.

Screw 64 passes a threaded portion in the linking unit which includes the mounting box 80 and the linking platform 50. The threaded portion in FIG. 15 is a nut 55 locked inside the linking platform 50. The bottom or lower end of the screw passes through the linking platform 50 and is positioned in the mounting pad or base 90. The bottom end of the screw can be permanently locked to a nut, which turns together with the screw when the height of the linking platform is adjusted. Turning the screw allow the nut 52 to carry the linking platform 50 and mounting box 80 up and down. However, the threaded portion can be located in other places such as inside the mounting box 80. The base of the assembly can be directly placed on the surface of the rooftop without having to drill holes.

Figure 16:
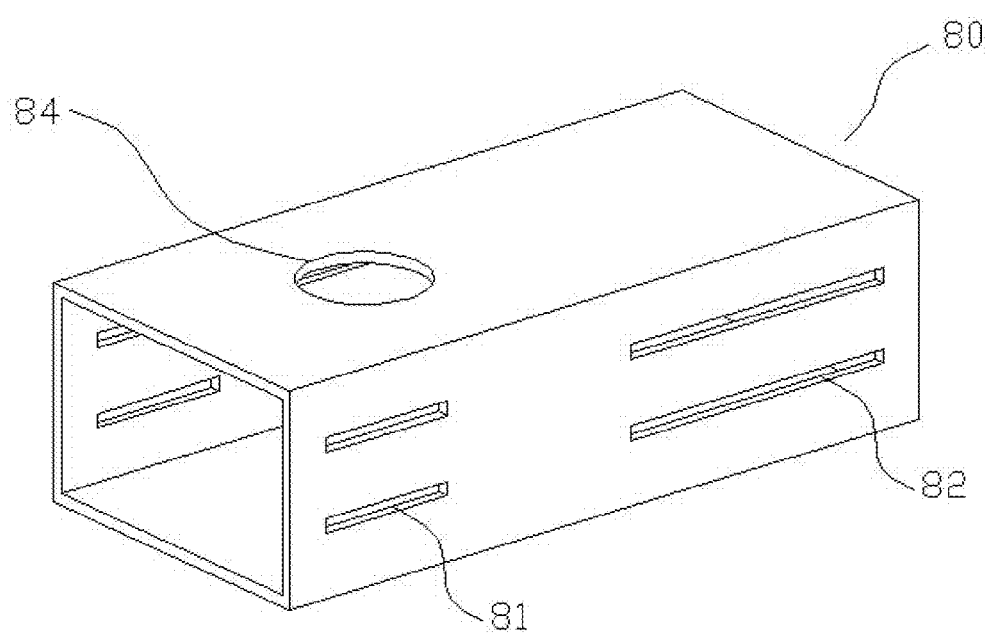
FIG. 16 shows mounting box 80. The hole 84 provides an access to screw 64 for adjusting the height of the mounting box.
Figure 17:
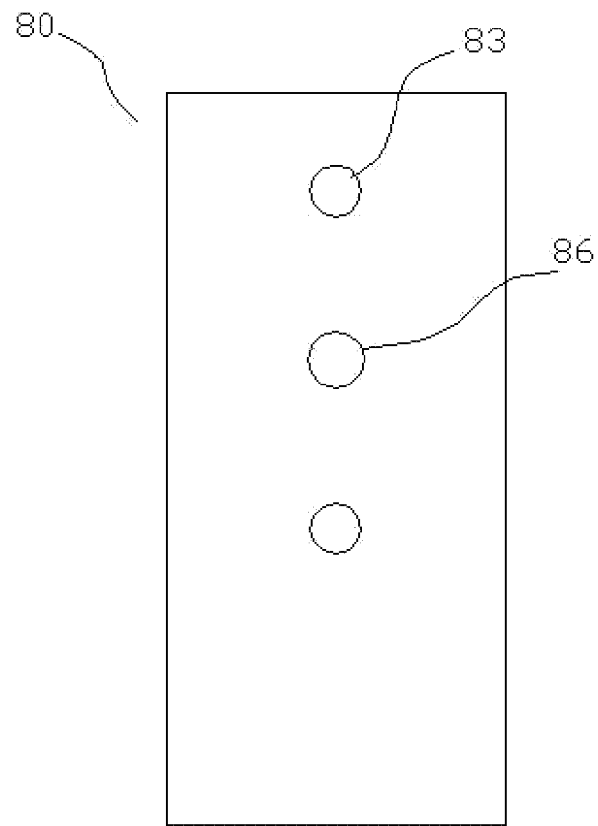
FIG. 17 shows a bottom view of the mountain box 80.

Mounting box 80 is illustrated in FIG. 16. The hole 84 provides an access to screw 64 for adjusting the height of the mounting box. The short slot 81 and the long slot 82 engage the supporting arms for the first mounting bracket and the second mounting bracket, respectively. The short slot 81 and the corresponding supporting arm can certainly be replaced with other interlocking structures as above described for the mounting bracket 40*a* and the mounting station 30. FIG. 17 provides a bottom view of the mountain box. Hole 83 is used for fixing the mounting box to the linking platform. Hole 86 aligns with hole 84 and is an exit point of screw 64 out of the mounting box.

In an alternative embodiment, the mounting box 80 has a threaded portion but is not permanently fixed to the linking platform 50. The mounting box can further include wings to stabilize the box on the linking platform. The linking platform thus is fixed to the base and the lower end of the screw can be positioned anywhere in the linking platform or the base. Turning the screw moves the mounting box up or down.

Figure 18:
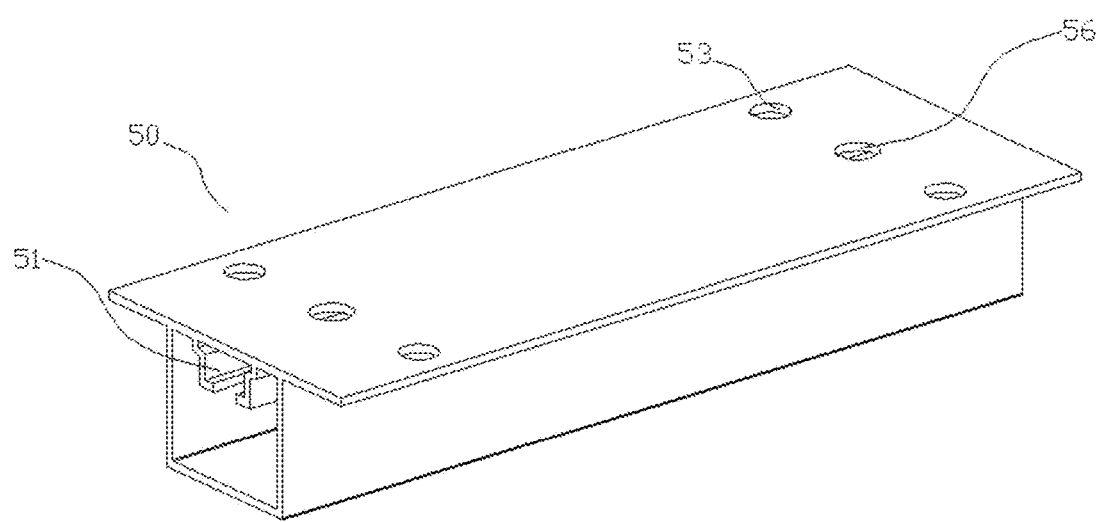
FIG. 18 shows linking platform 50 which includes hole 53, hold 56 and chamber 51.

Referring to FIG. 18, linking platform 50 includes hole 53, hold 56 and chamber 51. Hole 53 is for securing the mounting box to the platform 50 with a screw. Hole 56 provides an access point for screw 64, which further passes a threaded portion (here a nut 55) fixed inside chamber 51. As nut 55 is fixed inside chamber 51 does not turn with the screw 64, it essentially becomes a part of the linking platform. The diameter of the nut 55 has to be bigger than that of hole 56. Conceivable, the linking platform 50 and the mounting box 30 can be manufactured as a single unit which provides both functions of mounting and linking the brackets.

Figure 19:
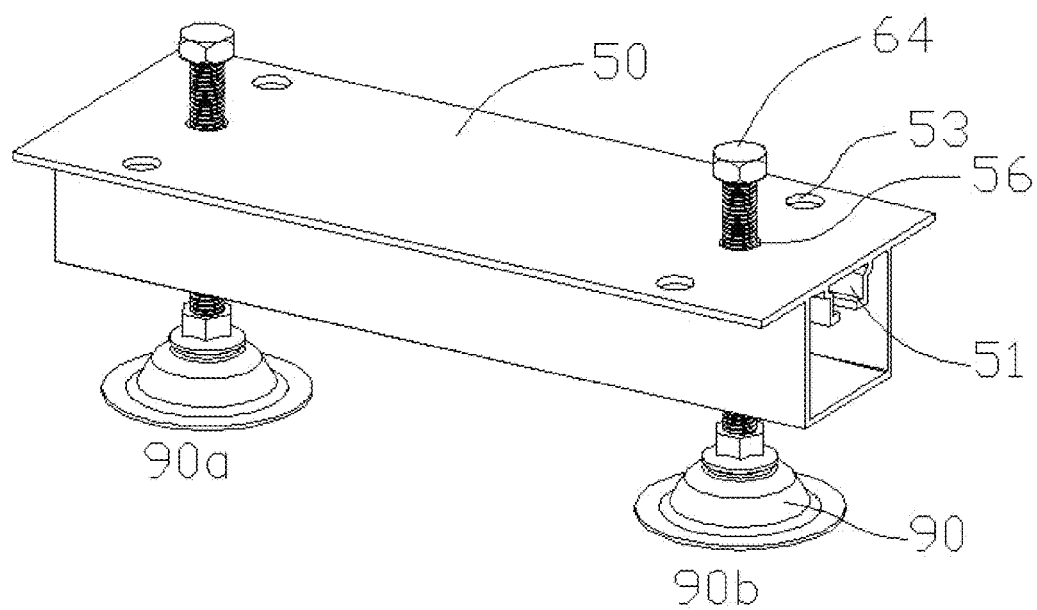
FIG. 19 shows the linking platform 50 which is connected to mounting base 90 via screw 64.
Figure 20:
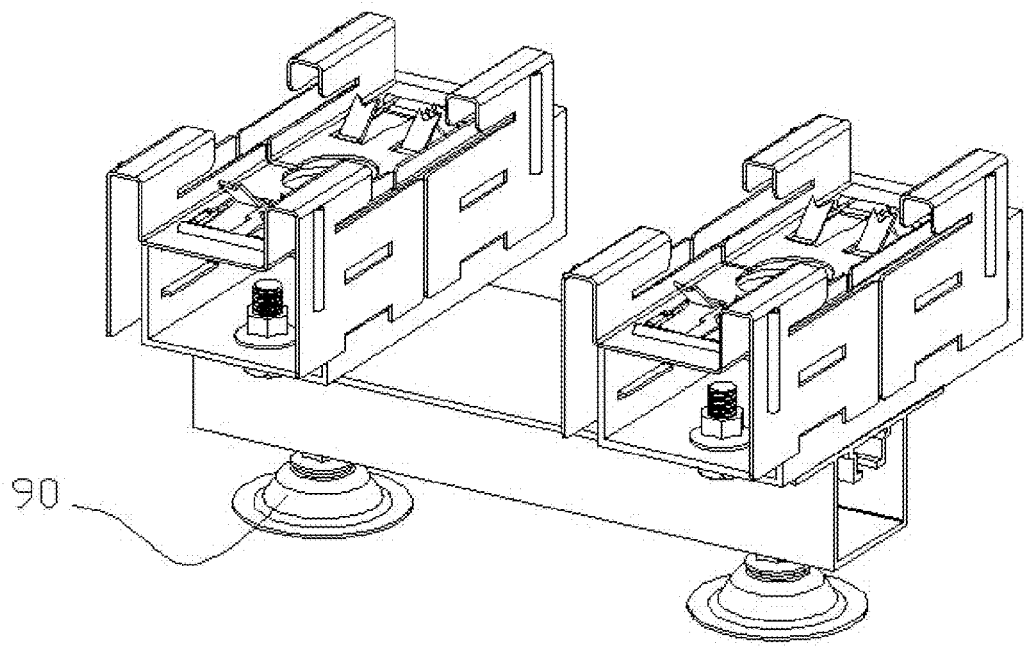
FIG. 20 shows a mounting assembly including the two mounting brackets set, the mounting boxes, the linking platform, and the mounting base.

Referring to FIG. 19, the linking platform 50 is connected to mounting base 90 via screw 64. The lower end of the screw is positioned in side mounting base 90. When turning screw 64, the linking platform 50 moves up or down and carries the mounting box and mounting brackets with it. Mounting base 90 directly sits on the rooftop without the need to drilling holes to secure it to the rooftop. The mounting base includes two separate pads 90*a* and 90*b* in FIG. 19. The two pads can be manufactured as a single unit if needed. FIG. 20 illustrates a mounting assembly including the two mounting brackets set, the mounting boxes, the linking platform, and the mounting base.

Figure 21A:
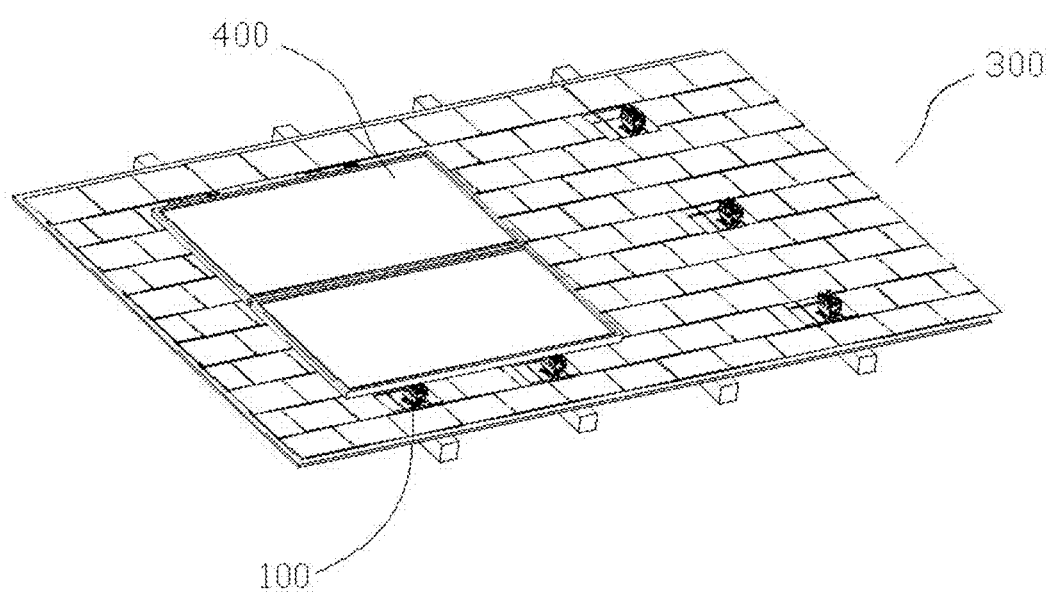
FIG. 21a shows a first column of solar panels which are mounted to the rooftop with assembly 100.
Figure 21B:
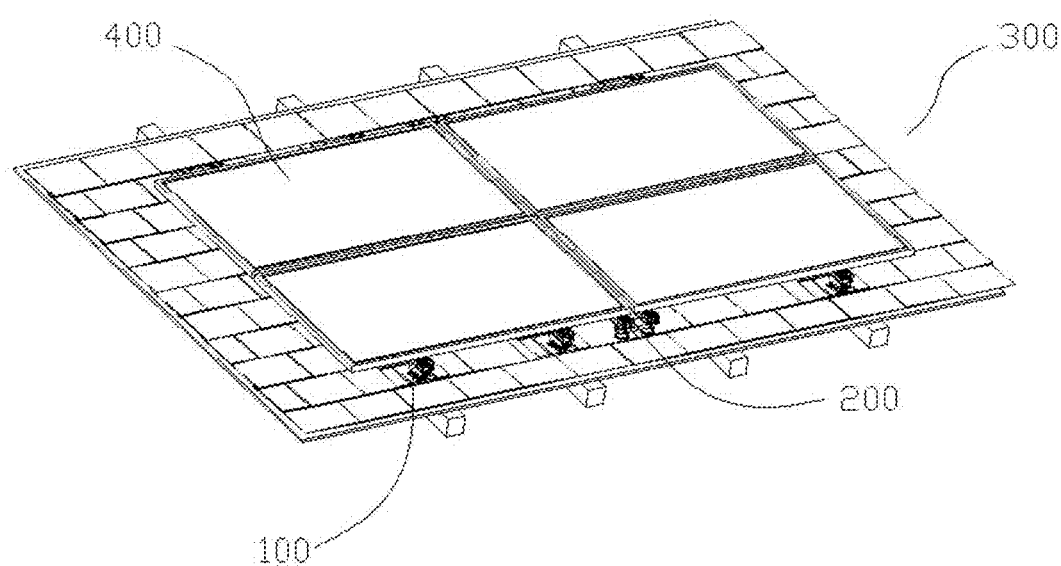
FIG. 21b shows a second column of panels which is installed via assembly 200, which connects two adjacent columns of solar panels.

Referring to FIG. 21*a*, a first column of solar panels are mounted to the rooftop with assembly 100. A second column of panels as shown in FIG. 21*b* is installed via assembly 200, which connects two adjacent columns of solar panels without having to drill into the rooftop and thus efficiently and effectively accomplish the installation.

Figure 22A:
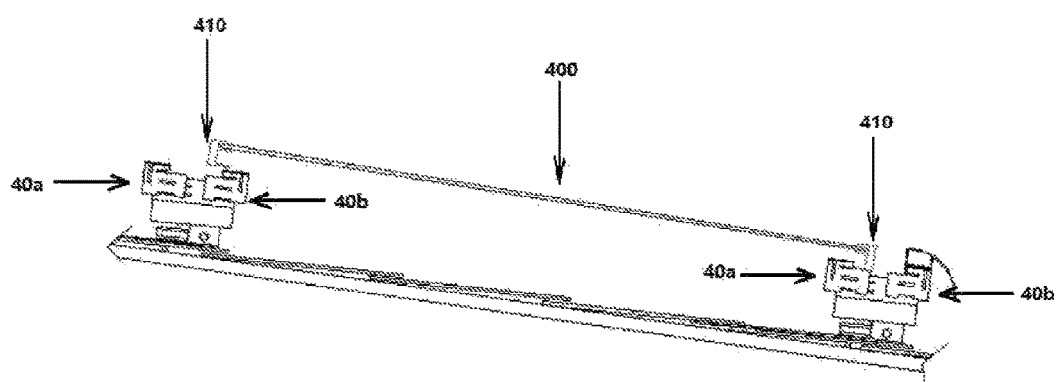
FIGS. 22a, 22b and 22c show the installation of solar panels.
Figure 22B:
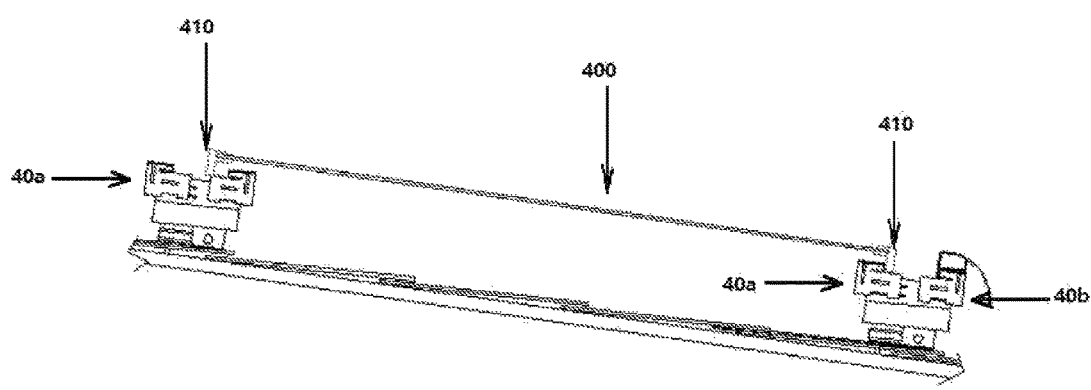
Figure 22C:
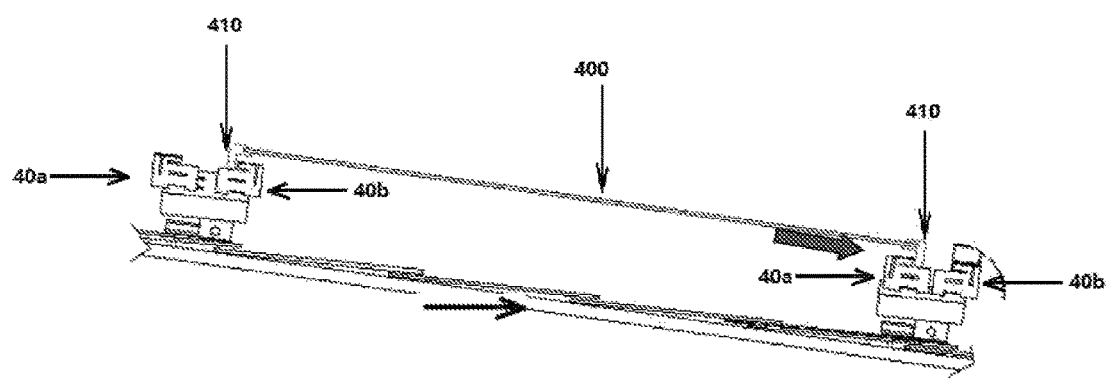

FIGS. 22*a*, 22*b* and 22*c* illustrate the installation of the solar panels. The L-arm 410 of the downward side of a solar panel 400 is first inserted into the guide channel of the second mounting bracket 40*b* which is shifted away from the first mounting bracket 40*a* along the slot in the mounting station. The L-arm 410 of the upward side of the solar panel is then pushed into the guide channel. Meanwhile, the second mounting bracket 40*b* at the downward side shifts toward the first mounting bracket 40*a* and still engages the L-arm 410 in the guide channel.

An alternative approach is to push the L-arm of the upward side of the solar panel into the respective mounting bracket and then engage the second mounting bracket with the L-arm of downward side of the solar panel. Engaging the second mounting bracket with the L-arm of downward side of the solar panel meanwhile shifts the second mounting bracket towards the first mounting bracket.

It should be understood from the foregoing that, while particular embodiments have been illustrated and described, various modifications can be made thereto and are contemplated herein. It is also not intended that the invention be limited by the specific examples provided within the specification. While the invention has been described with reference to the aforementioned specification, the descriptions and illustrations of the preferable embodiments herein are not meant to be construed in a limiting sense. Furthermore, it shall be understood that all aspects of the invention are not limited to the specific depictions, configurations or relative proportions set forth herein which depend upon a variety of conditions and variables. Various modifications in form and detail of the embodiments of the invention will be apparent to a person skilled in the art. It is therefore contemplated that the invention shall also cover any such modifications, variations and equivalents.

The invention claimed is:

1. A mounting assembly for attaching one or more solar panels to a roof top, comprising:
   a mounting base installable on a rooftop;
   a mounting station connectable to the mounting base, wherein the mounting station comprises a top plate connected to two side plates;
   a first mounting bracket and a second mounting bracket, wherein each of the first and second mounting bracket comprises:
   a mounting plate, and
   a first and second supporting walls perpendicularly connected to opposite edges of the mounting plate and configured to attach to the mounting station,
   wherein the mounting plate or at least one of the first and second supporting walls comprises an extended top portion which protrudes upward from a mounting surface of the mounting plate, wherein the top portion comprises a guide channel extending from a side edge of the top portion to receive a portion of a frame of a solar panel.

2. The mounting assembly of claim 1, wherein each of the first and second supporting walls comprises the extended top portion.

3. The mounting assembly of claim 1, wherein the mounting plate comprises the extended top portion.

4. The mounting assembly of claim 1, wherein the mounting plate of each of the first mounting bracket and the second mounting bracket is configured to secure the solar panel onto the mounting brackets once the portion of the frame of the solar panel is fully engaged with the guide channel.

5. The mounting assembly of claim 4, wherein the mounting plate comprises a first resilient plate extending from the mounting plate upwards at an angle with respect to the surface of the mounting plate and is oriented parallel to a longitudinal direction of the mounting plate, wherein the first resilient plate has a serrated top edge configured to touch a bottom surface of the frame of the solar panel when the L-shaped portion of the frame of the solar panel is fully engaged with the guide channel so that the solar panel is prevented from longitudinal movement along the guide channel.

6. The mounting assembly of claim 4, wherein the mounting plate comprises a second resilient plate extending from the mounting plate upwards at an angle with respect to the surface of the mounting plate and is oriented perpendicular to a longitudinal direction of the mounting plate, wherein the second resilient plate has a serrated top edge configured to touch a bottom surface of the frame of the solar panel when the L-shaped portion of the frame of the solar panel is fully engaged with the guide channel so that the solar panel is prevented from lateral movement perpendicular to the guide channel.

7. The mounting assembly of claim 1, wherein the side plates of the mounting station are configured to immobilize the first mounting bracket and allow the second mounting bracket to move in a longitudinal direction on the mounting station.

8. The mounting assembly of claim 7, wherein the mounting station comprises a first set of slots for receiving and locking a first set of supporting arms of the first mounting bracket.

9. The mounting assembly of claim 7, wherein the mounting station comprises a second set of slots for receiving a second set of supporting arms of the second mounting bracket, and wherein the second set of supporting arms are movable in the second set of slots.

10. The mounting assembly of claim 1, wherein the first and second mounting brackets are so positioned such their respective guiding channels are aligned.

11. The mounting assembly of claim 1, wherein the height of the mounting station relative to the mounting base is adjustable.

12. The mounting assembly of claim 11, wherein the mounting station comprises a threaded hole for receiving a first screw, wherein a top end of the first screw is accessible from a hole in the top plate of the mounting station, and a bottom end of the first screw is positioned in the mounting base, and the height of the mounting station from the mounting base is adjusted by turning the first screw.

13. The mounting assembly of claim 1, wherein the mounting base comprises a mounting seat configured to fixedly attach to the rooftop; and a slider attachable to the seat, wherein the slider is capable of moving along the seat and carrying the mounting station.

14. The mounting assembly of claim 13, wherein the mounting seat is configured to be secured in position relative to the rooftop with a second screw, and wherein the first and the second mounting brackets are configured to provide an opening for access to the second screw.

\* \* \* \* \*